(12) United States Patent
Dias et al.

(10) Patent No.: US 11,686,413 B2
(45) Date of Patent: *Jun. 27, 2023

(54) PUSH-TO-CONNECT JOINT ASSEMBLY AND DEVICE

(71) Applicant: Quick Fitting Holding Company, LLC, Warwick, RI (US)

(72) Inventors: Libardo Ochoa Dias, West Warwick, RI (US); Herbert J. Bouchard, West Greenwich, RI (US); David B. Crompton, Stonington, CT (US)

(73) Assignee: Quick Fitting Holding Company, LLC, East Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/386,847

(22) Filed: Jul. 28, 2021

(65) Prior Publication Data

US 2022/0268384 A1  Aug. 25, 2022

Related U.S. Application Data

(63) Continuation of application No. 17/185,126, filed on Feb. 25, 2021, now Pat. No. 11,105,452.

(51) Int. Cl.
*F16L 37/091* (2006.01)

(52) U.S. Cl.
CPC .................. *F16L 37/091* (2013.01)

(58) Field of Classification Search
CPC ................ F16L 37/091; F16L 37/0915
See application file for complete search history.

(56) References Cited

U.S. PATENT DOCUMENTS

| | | | |
|---|---|---|---|
| 8,398,122 B2 * | 3/2013 | Crompton | F16L 37/0915 29/521 |
| 8,480,134 B2 * | 7/2013 | Crompton | F16L 37/0915 29/521 |
| 8,844,981 B1 * | 9/2014 | Crompton | F16L 37/0915 285/315 |
| 9,923,354 B2 * | 3/2018 | Crompton | H02G 15/013 |
| 10,969,047 B1 * | 4/2021 | Crompton | F16L 19/086 |
| 11,105,452 B1 * | 8/2021 | Dias | F16L 37/0915 |
| 2011/0140417 A1 * | 6/2011 | Kluss | F16L 37/0915 285/345 |

* cited by examiner

*Primary Examiner* — David Bochna
(74) *Attorney, Agent, or Firm* — Williams Mullen; Thomas F. Bergert (57) ABSTRACT

A push-to-connect joint assembly, device and method include a fitting formed with an interior wall having axially inner, axially intermediate and axially outer portions that facilitate re-use and repair of push-to-connect fittings and valves without damage to the fitting or valve elements or the pipe, and without coining, gluing or threaded engagement of parts. In embodiments, a packing arrangement inserted into a fitting includes a sealing member, a fastening ling, a seat ring, and a retainer including a shield member and/or a seat retainer.

4 Claims, 12 Drawing Sheets

PUSH-TO-CONNECT JOINT ASSEMBLY AND DEVICE

CROSS-REFERENCE TO RELATED APPLICATIONS

The present application is a continuation application of U.S. patent application Ser. No. 17/185,126 fled on Feb. 25, 2021, which issued as U.S. Pat. No. 11,105,452 on Aug. 31, 2021, the contents of which are incorporated by reference herein in their entirety.

TECHNICAL FIELD

The present disclosure relates to fluid, refrigerant and gas flow systems, and more particularly to a push-fit joint assembly, device and method that facilitates the simple connection, disconnection, repair and re-use of piping and tubing system parts without threading, welding, soldering or brazing.

BACKGROUND

Piping systems exist to facilitate the flow of fluids (e.g., liquid, gas (such as air) or plasma). For example, homes, schools, medical facilities, commercial buildings and other occupied structures generally require integrated piping systems so that water and/or other fluids can be circulated for a variety of uses. Liquids and/or gases such as cold and hot water, breathable air, glycol, compressed air, inert, gases, cleaning chemicals, waste water, plant cooling water and paint and coatings are just some examples of the types of fluids and gases that can be deployed through piping systems. Tubing and piping types can include, for example, copper, stainless steel, CPVC (chlorinated polyvinyl chloride) and PEX (cross-linked polyethylene). For purposes of the present disclosure, the term "pipe" or "piping" will be understood to encompass one or more pipes, tubes, piping elements and/or tubing elements.

Piping connections are necessary to join various pieces of pipe and must be versatile in order to adapt to changes of pipe direction required in particular piping system implementations. For example, fittings and valves may be employed at the ends of open pieces of pipe that enable two pieces of pipe to fit together in a particular configuration. Among fitting types there are elbows, "tees", couplings adapted for various purposes such as pipe size changes, ends, ball valves, stop valves, and partial angle connectors, for example.

In the past, pipe elements have been traditionally connected by brazing, welding and/or soldering them together using a torch. Brazing pipe fittings can be time-consuming, unsafe, and labor intensive. Brazing also requires employing numerous materials, such as copper pipes and fittings, emery cloths or pipe-cleaning brushes, flux, silver solder, a soldering torch and striker, a tubing cutter and safety glasses, for example. The process for brazing pipes can proceed by first preparing the pipe to be brazed, as the copper surface must be clean in order to form a good joint. The end of the pipe can be cleaned on the outside with emery cloth or a specially made wire brush. The inside of the fitting must be cleaned as well. Next, flux (a type of paste) can be applied to remove oxides and draw molten solder into the joint where the surfaces will be joined. The brush can be used to coat the inside of the fitting and the outside of the pipe with the flux. Next, the two pipes are pushed together firmly into place so that they "bottom out"—i.e., meet flush inside the fitting. The tip of the solder can be bent to the size of the pipe in order to avoid over-brazing. With the pipes and fitting in place, the torch is then ignited with the striker or by an auto-strike mechanism to initiate brazing. After heating for a few moments, if the copper surface is hot enough such that it melts when touched by the end of the solder, the solder can then be applied to the joint seam so that it runs around the joint and bonds the pipe and fitting together. Once the joints are brazed, the systems can be cleaned and purged with an inert material.

In recent years, push-fit technology has been employed with piping systems to reduce the dangers and time involved in brazing joints. Push-fit methods require minimal knowledge of pipe fittings and involve far fewer materials than brazing. For example, one may only need the pipes, quick-connect fittings, a chamfer/de-burring tool and tubing cutter in order to connect pipes using push-fit technology.

The steps involved in connecting piping systems using push-fit technology can be outlined as follows. First, the pipe is cut to the appropriate length and the end of the pipe is cleaned with the de-burring tool. Then the pipe and fitting are pushed together for connection. The fitting is provided with a fastening ring (also called a collet, grip ring or grab ring) having teeth that grip the pipe as it is inserted. The fastening ring device is employed to provide opposing energy, preventing the device from disconnection while creating a positive seal. Accordingly, no wrenches, clamping, gluing, brazing or soldering is involved. Push-fit and/or quick connect technology for piping systems can be obtained, for example, through Quick Fitting Holding Company, LLC of Warwick, R.I., USA, suppliers of the CoPro®, ProBite®, LocJaw™, BlueHawk™, CopperHead® and Push Connect® lines of push fittings and related products. Also, such technology is described, for example, in U.S. Pat. Nos. 7,862,089; 7,942,161; 8,205,915; 8,210,576; 8,398, 122; 8,480,134; 8,844,974; 8,844,981; 9,671,049; 9,777, 873; 9,816,655; 9,816,656; 9,819,165; 9,822,912; 9,857, 006; 9,879,810; 9,920,866; 9,923,354; 10,094,500; 10,096, 981; 10,180,202; 10,291,009; 10,400,929; 10,461,514; 10,670,173; and 10,700,506, the disclosures of which are incorporated herein by reference in their entireties.

In past push on pipe coupling technology, the fastening ring is inserted into the fitting body along with a plastic grip ring support that typically fails under extensive tensile testing. Further, the coupling must then be either coin rolled, glued or receive a threaded cap member to retain the fastening ring inside the fitting body. In addition to the added steps for the manufacture and assembly of the coupling, the strength of the plumbing joint is determined by the retaining cap member. The additional steps and components add significant labor and manufacturing costs to the final product cost and reduce the overall production capability due to the extensive time required for proper assembly.

In addition to the above, when using a threaded retaining cap method, the process of cutting threads into the fitting body and the retaining cap elevates the cost of machining the fitting components. Further, the threaded end cap method requires mechanical assembly as well as the added cost and application of a thread sealant to the threads. In prior efforts that employ a coined retaining cap method, the process of coining the fitting body as the retaining cap significantly increases the cost of final assembly of the fitting. Additionally, the coining process permanently encapsulates the fastening ring inside the fitting, whereby the fastening ring cannot be removed without complete destruction of the ring and fitting.

Along with additional assembly steps and increased manufacturing costs, past pipe fittings and connection methods do not allow repair for various reasons. In some cases, this is because they are factory sealed, for example. In other cases, it is because the separation of the fitting from the pipe can damage or induce wear on the parts. For example, some push-to-connect fittings provide permanently fixed demounting rings for removing the fittings. The demounting rings can be depressed axially to lift the fastening ring teeth off of the surface of the inserted pipe, such that the pipe can then be withdrawn. This arrangement, however, can subject the fittings to tampering and shorter life. In addition, while fastening ring devices work effectively as an opposing retaining member, their functionality makes them nearly impossible to dismount, remove or detach for re-use. The fastening rings are thus permanently affixed unless they are cut and removed, which then destroys the fastening ring.

Whether connected by traditional brazing methods or with push-fit methods, past efforts have been specifically provided for the connection of like materials and lack the ability to connect two unlike materials, such as copper with CPUC, PEX or stainless steel, or any other combination of unlike materials. Past methods further invariably require the replacement of fittings and valves, and do not allow re-use of the fittings or valves in instances where only a small internal component needs to be repaired or replaced. Further, past products and methods do not provide enhanced protective retainers among various packing components such that, in the event of degrading or catastrophic failure of internal parts, such parts would be precluded from separating or moving out of the fitting.

With regard to heating, ventilation and air conditioning (HVAC) applications, there can be difficulties in changing out elements of the joint assembly, regardless of whether brazing or push-fit methods have originally been used.

SUMMARY

The present disclosure provides, in part, a push-to-connect joint assembly that facilitates the re-use of push fittings without damage to the fitting internal elements, the fitting or the pipe. Embodiments of the present disclosure can be connected using no tools, threading, clamps, brazing or glues, while creating a leak-free seal at the connected joining area. Further, embodiments of the present disclosure can join both like and unlike piping elements without pressing, welding, brazing or threading the elements into place. As described, various embodiments of the present disclosure can withstand up to 5,000 pounds of pressure or more and are employable in air condition refrigeration lines within an HVAC environment.

Embodiments of the quick connection pipe joint assembly provided as part of the present disclosure employs a release pusher that, when removed, exposes the clamping, sealing and fastening mechanisms of the fitting. The release pusher moves axially and can push the fastening ring of the present disclosure in order to facilitate the release of a cylindrical object such as a piping element held within the fitting.

Various embodiments of the present disclosure provide a push fitting joint assembly including one or more of a sealing ring member, a sealing ring spacer, a fastening ring, a seat ring, a shield member, a seat retainer and a release pusher member. The shield member and/or the seat retainer represent elements of a retainer abutting the seat ring when installed. The shield member provided as part of the present disclosure can be configured so as to be slidable into the fitting and snapped into place during installation prior to the seat retainer. The shield member can be provided with flat or substantially flat sides to drop into position at an angle other than perpendicular to the central axis of the fitting. No coining is necessary in order to insert the shield member.

DETAILED DESCRIPTION OF THE PREFERRED EMBODIMENTS

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements, Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings, Therefore, it is to be understood that the presently disclosed subject matter is not to be limited to the specific embodiments disclosed and that modifications and other embodiments are intended to be included within the scope of the appended claims.

For purposes of the present disclosure, the term "tube", "pipe", "piping", "conduit", "conduit element" or "piping element" will be understood to encompass one or more pipes, tubes, conduits, piping elements and/or tubing elements, and may be used interchangeably. Further, for purposes of the present disclosure, a fitting can encompass a valve member and other piping elements including, but not limited to: a coupling joint, an elbow joint, a tee joint, a stop end, a ball valve member, tubing and other objects having substantially cylindrical openings. Further, for purposes of the present disclosure, a fitting (also referred to as a body member or main body component) can encompass a valve member and other piping elements including, but not limited to: a coupling joint, an elbow joint, a tee joint, a stop end, a ball valve member, tubing and other objects having cylindrical openings.

In various embodiments, one or more sealing member gasket inserts (e.g., sealing ring members) fit within a sealing ring compartment defined in and/or machined into the interior surface of the fitting. In addition, at each pipe receiving end of the fitting, a tube support member compartment is machined into the interior to retain at least a portion of the packing arrangement. The fitting interior is formed to provide integrated support for the sealing member(s) and fastening ring when opposing force is applied to piping elements that have been inserted into the fitting. In various embodiments, a release pusher facilitates connection and disconnection of piping elements. Other methods, devices and arrangements associated with the present disclosure are described herein.

It will be appreciated that reference to "a", "an" or other indefinite article in the present disclosure encompasses one or more than one of the described element. Thus, for example, reference to a sealing ring may encompass one or more sealing rings, and so forth.

The fitting and joint assembly components provide integrated support for the sealing member(s) and fastening ring when opposing force is applied to piping elements that have been inserted into the fitting. In various embodiments, a retaining ring and shield member are employed within a retaining ring support compartment machined into the interior wall of the fitting to provide additional support for the fastening ring and to cooperate with the release pusher to facilitate connection and disconnection of joint assembly components.

According to embodiments shown in FIGS. 1 through 27, the push-fit piping joint assembly 10 includes a fitting (i.e., fitting body member) 12 having an interior wall 13 and an exterior wall 15. The inner wall 13 forms a cavity 14 extending along a central axis 16 that extends axially through the fitting 12.

Figure 2:
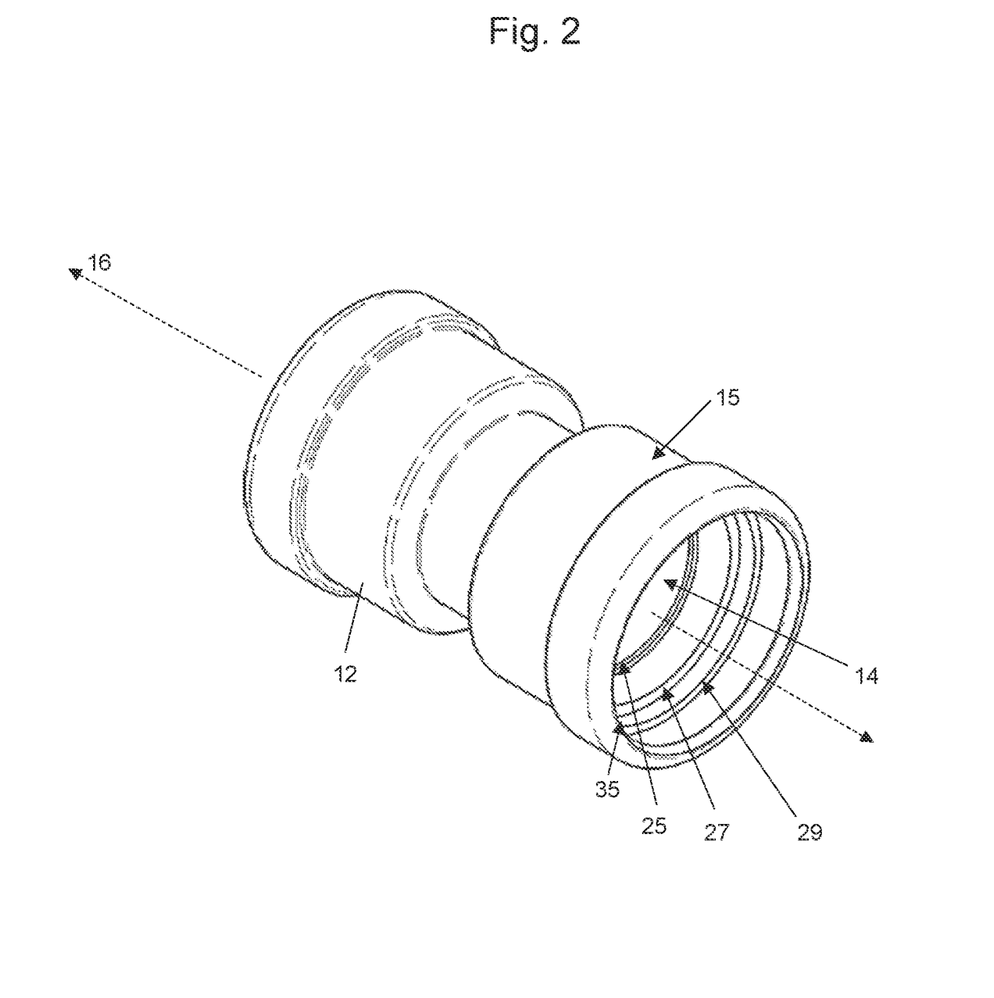
FIG. 2 is a perspective view of a fitting in accordance with embodiments of the present disclosure.
Figure 3:
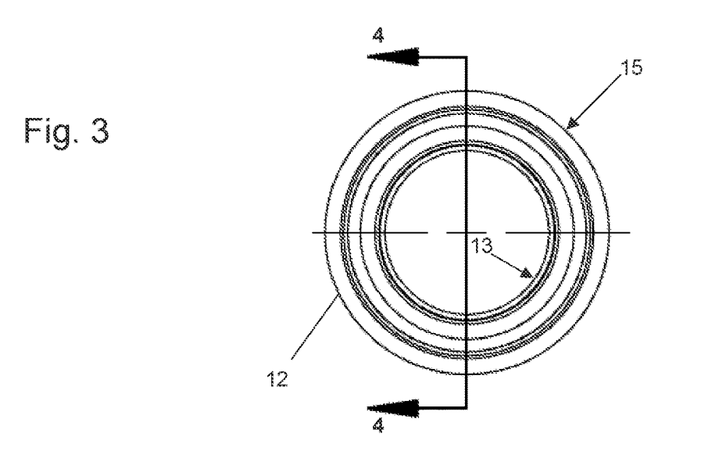
FIG. 3 is a right side view of the fitting of FIG. 2.
Figure 4:
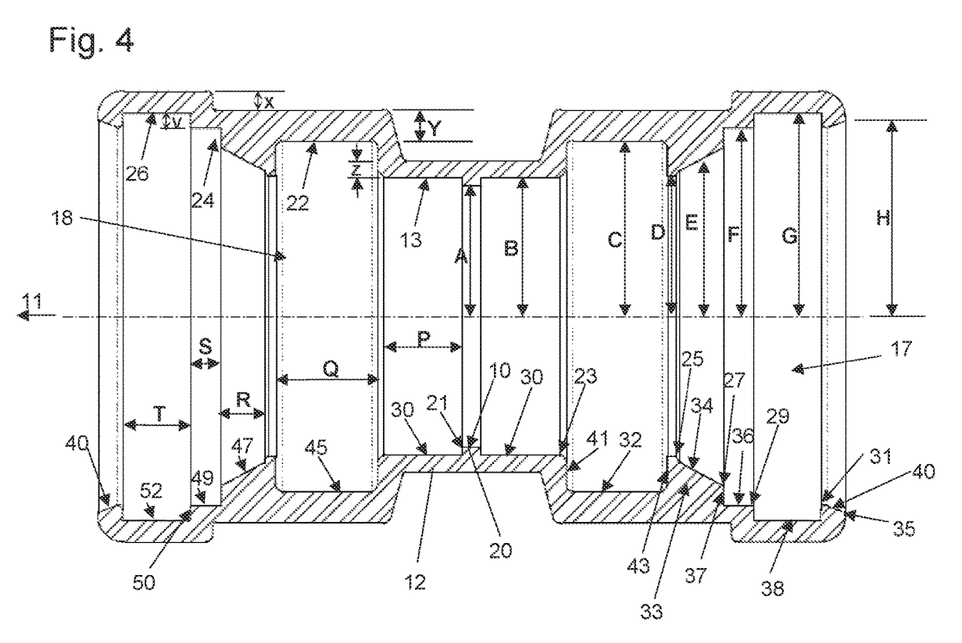
FIG. 4 is a front cross-sectional view of the fitting taken along line 4-4 of FIG. 3.

As shown in FIGS. 2 and 4, the interior wall 13 of the fitting 12 includes a first segment 17 separated from a second segment 18 by a radially inwardly extending tube stop 20. In alternative embodiments, no tube stop is present. Further, in still other embodiments, the axially inner portion 30 is formed with a slight taper such that it extends slightly radially outwardly as it extends axially outwardly from the interior of the fitting 12. The first 17 and second 18 segments can be formed so as to include a sealing ring compartment 22, a fastening ring compartment 24 and a retainer compartment 26. These compartments 22, 24, 26 may be part of different axially intermediate portions 32, 34, 36, 38 of the fitting interior wall 13. As further shown in FIG. 4, an axially inner portion 30 of the interior wall 13 extends axially outwardly from a radial wall 21 of the tube stop 20 to a first divider edge 23. The tube stop 20 has a radius A from the axis 11 and the axially inner portion 30 has a radius B from the axis 11 which is greater than radius A. A first axially intermediate portion 32 of the interior wall 13 extends axially outwardly from the first divider edge 23 to a second divider edge 25, and the first axially intermediate portion 32 has a radius C from the axis 11 that is greater than radius B. The second divider edge 25 has a radius 13 from the axis. The first axially intermediate portion 32 corresponds to the sealing ring compartment 22 and has first 41 and second 43 sealing ring walls and a sealing ring floor 45 in which one or more sealing rings 70 can be maintained. A second axially intermediate portion 34 of the interior wall 13 extends axially and radially outwardly from the second divider edge 25 to a third divider edge 27, and the second axially intermediate portion 34 has a radius E from the axis 11 that is greater than radius A, radius B and radius D but less than radius C. In various embodiments, such as shown in FIG. 4, the second axially intermediate portion 34 and second divider edge 25 are formed as a spacer gland 33 machined into the fitting 12.

A third axially intermediate portion 36 of the interior wall 13 extends axially outwardly from the third divider edge 27 to a fourth divider edge 29, and the third axially intermediate portion 36 has a radius F from the axis 11 that is greater than radius A, radius B, radius C, radius D and radius E. The third axially intermediate portion 36 corresponds to the fastening ring compartment 24 and the radially extending fastening ring support wall 37 that helps form the third divider edge 27 can support the axially inner surface 152 of the base 73 of the fastening ring 74 when inserted, as described elsewhere herein. The third axially intermediate portion 36 also provides a fastening ring support floor 49 in which the base portion 73 of a fastening ring 74 can reside when installed.

A fourth axially intermediate portion 38 of the interior wall 13 extends axially outwardly from the fourth divider edge 29 to a fifth divider edge 31, and the fourth axially intermediate portion 38 has a radius G from the axis 11 that is greater than radius A, radius B, radius C, radius D, radius E and radius F. An axially outer portion 40 of the interior wall 13 extends axially and radially outwardly from the fifth divider edge 31 to an axially outermost edge 35, and the axially outer portion 40 has a radius nil that is greater than radius F and less than radius G. The axially outer portion 40 can be angled axially and radially outwardly as shown in FIG. 4 so as to facilitate insertion of joint assembly elements and piping elements during operation. Similarly, first divider edge 23 can be angled axially and radially outwardly as shown in FIG. 4 so as to facilitate insertion of piping elements during operation. In various embodiments, second divider edge 25 extends axially between the first 32 and second 34 axially intermediate portions and radius D is substantially the same as radius B to facilitate even insertion of piping elements during operation. In this way, second divider edge 25 forms a tube engaging platform for engaging the side walls of inserted tubes or pipes. In some embodiments, radius D is slightly less than radius B, which provides added stability to the assembly when a pipe or tube is inserted into the fitting 12. In embodiments where the axially inner portion 30 is formed with a taper as described above, the radius B is not constant but rather is progressively larger upon extending axially outwardly from the interior of the fitting 12. In various embodiments, the second axially intermediate portion 34 has a spacer wall 47 extending axially and radially outwardly from the tube engaging platform or second divider edge 25 to the third divider edge 27, which can be considered an axially outer edge of the spacer wall 47. In various embodiments, the fourth axially intermediate portion 38 includes a retainer support wall 50 extending radially outwardly from the fastening ring support floor 49 and a retainer support floor 52 extending axially outwardly from the retainer support wall 50. In various embodiments, the fourth axially intermediate portion 38 corresponds to the retainer compartment 26.

It will be appreciated that the tube stop 20, axially inner portion 30, axially intermediate portions 32, 34, 36, 38, axially outer portion 40 and related compartments 22, 24 and 26 are formed as part of the interior wall 13 of the fitting 12 through hydroforming or similar methods. In this way, the internal portions and compartments within the fitting 12 are sized with the varying radial depths described above so as to receive packing arrangement elements for desired operation as described herein. For example, the fitting 12 maintains a profile and structure that permits it to house the elements of the packing arrangement as described herein, while retaining significant strength to withstand up to 5000 pounds of pressure or more. It will further be appreciated that the fitting with compartments and tube stop comprises a monolithic, integrated structure.

In various embodiments, the tube stop 20, axially inner portion 30, axially intermediate portions 32, 34, 36, 38, axially outer portion 40 and related compartments 22, 24 and 26 are formed with varying axial lengths to further facilitate packing and operation of the fitting with joint assembly elements for desired operational tolerances. For example, axially inner portion 30 can have an axial length P, first axially intermediate portion 32 can have an axial length Q, second axially intermediate portion 34 can have an axial length R, third axially intermediate portion 36 can have an axial length S and fourth axially intermediate portion 38 can have an axial length T. In various embodiments, the first axially intermediate portion axial length Q is greater than the axially inner portion axial length P. Also, the axially inner portion axial length P can be greater than each of the second R, third S and fourth T axially intermediate portion axial lengths.

According to embodiments of the present disclosure as shown in FIG. 4, the fitting 12 may be formed with different thicknesses at different intervals to support operation and stability of the fitting 12. For example, the fourth axially intermediate portion 38 can be bound by a fitting body thickness X, the third axially intermediate portion 36 can be bound by a fitting body thickness V, the first axially intermediate portion 32 can be bound by a fitting body thickness Y and the axially inner portion 30 can be bound by a fitting body thickness Z, wherein thickness Y is at least thirty percent thicker than thicknesses X, V and Z. The increased thickness Y provides added support to the sealing ring compartment 22 as a tube is inserted into and withdrawn from the fitting 12.

In various embodiments, joint assembly internal components and/or a packing arrangement according to the present disclosure can include one or more of: a sealing ring member 70 (which can be optionally lubricated), an optional sealing ring spacer 72, a fastening ring 74, a seat ring 76, a shield member 78, a seat retainer 80 and a release pusher 82. In various embodiments, the fastening ring 74, sealing member(s) 70, sealing ring spacer 72 and release pusher 82 each have an internal diameter that allows for smooth and snug engagement of a piping or tubing element external surface (92 in FIGS. 26 and 27), whereas the shield member 78 and seat retainer 80 do not contact any piping or tubing element inserted into or removed from the fitting. Further, the release pusher 82 does not contact fitting interior wall 13 during operation. The fitting 12 is substantially hollow, in the sense that the interior wall 13 defines a pipe receiving opening 14 extending axially therethrough. It will be appreciated that embodiments of the joint assembly, the sealing ring members 70 are positioned together in mating contact without a sealing ring spacer 72. In various embodiments, sealing ring members 70 are joined or formed together as a single monolithic unit to create a combination seal without a sealing ring spacer 72.

Figure 5A:
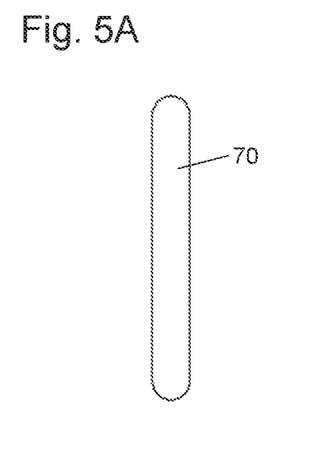
FIGS. 5A and 5B are right side and front views, respectively, of a sealing ring in accordance with embodiments of the present disclosure.
Figure 5B:
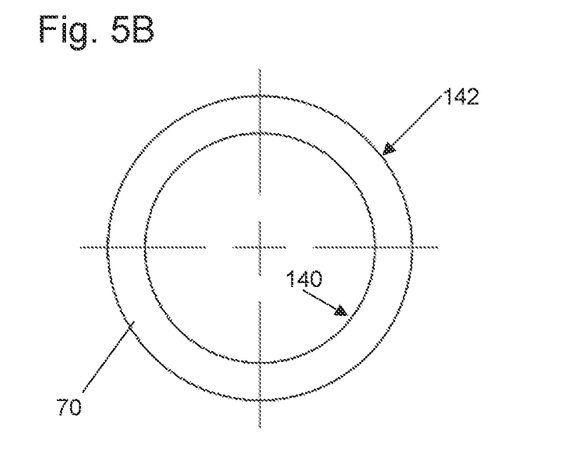
Figure 6A:
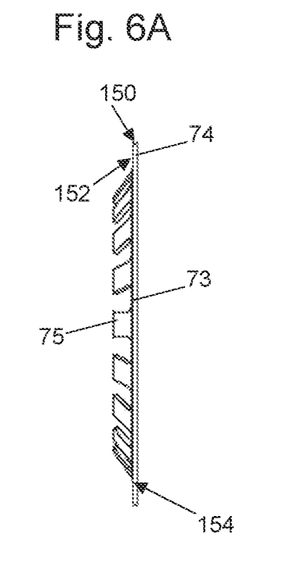
FIGS. 6A and 6B are left side and front views, respectively, of a fastening ring in accordance with embodiments of the present disclosure.
Figure 6B:
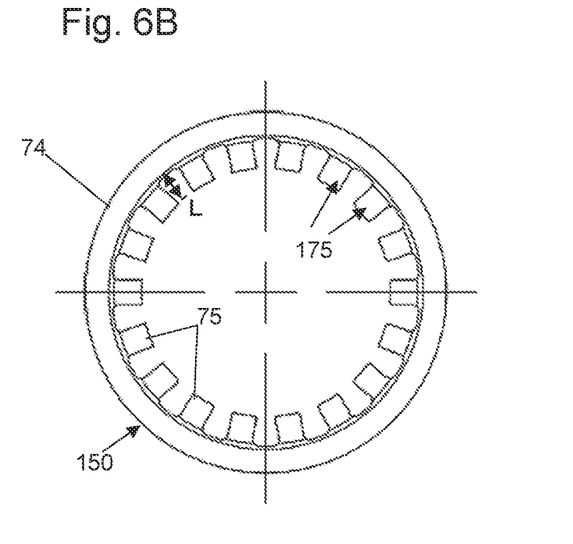
Figure 7:
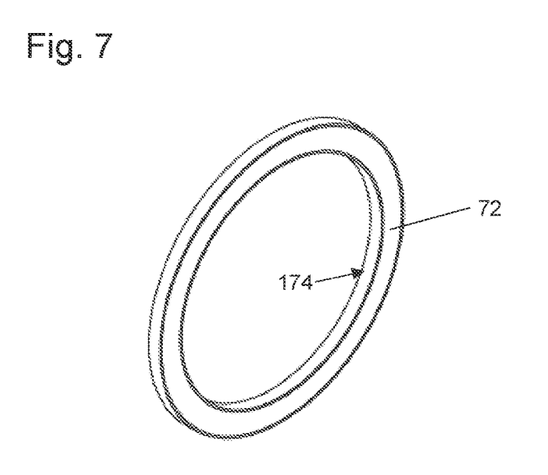
FIG. 7 is a perspective view of a sealing ring spacer in accordance with embodiments of the present disclosure.
Figure 8:
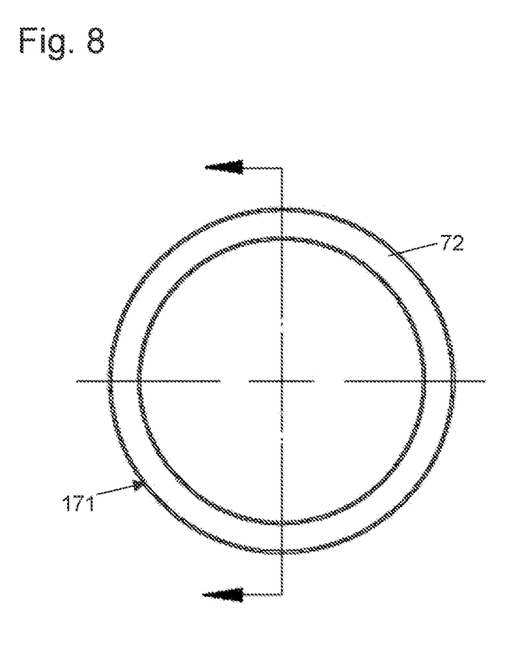
FIG. 8 is a front view of the sealing ring spacer of FIG. 7.
Figure 9:
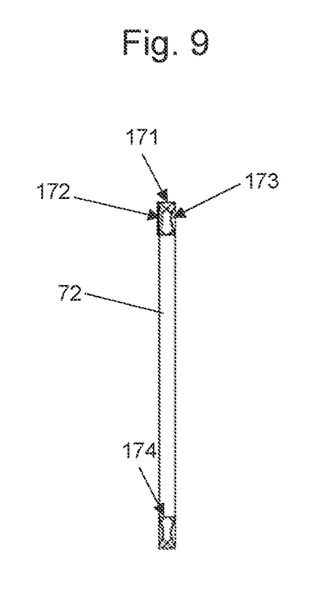
FIG. 9 is a side view of the sealing ring spacer of FIG. 7.
Figures 10, 11:
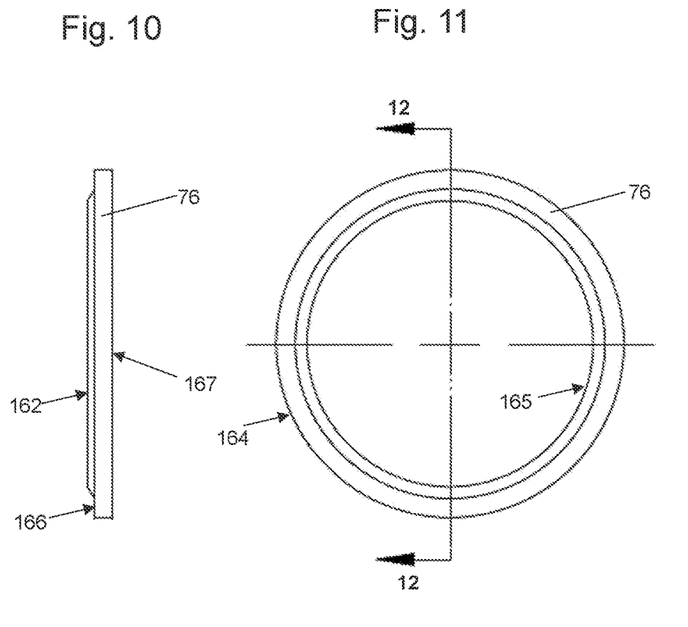
FIG. 10 is a side view of a seat ring in accordance with embodiments of the present disclosure.
FIG. 11 is a front view of the seat ring of FIG. 10.
Figure 12:
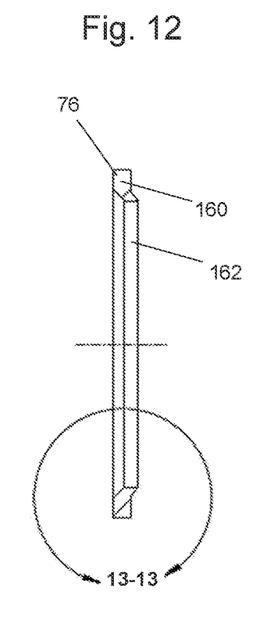
FIG. 12 is a cross-sectional view of the seat ring taken along line 12-12 of FIG. 11.
Figure 13:
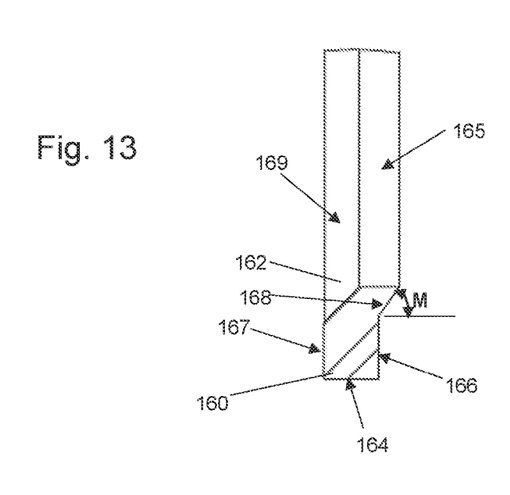
FIG. 13 is an enlarged view of encircled portion 13-13 of FIG. 12.

In various embodiments, the fitting 12 can be forged CW617N brass, with full porting and full flow fitting, for example. The lubricant for the one or more sealing members 70 can be a food grade lubricant, for example. It will be appreciated that the sealing members 70 can comprise a flat ring or washer-type seal member in addition or as an alternative to a circular member of substantially circular cross-section with an interior surface 140 and exterior surface 142 as shown in FIGS. 5A and 5B. The fastening ring 74 can comprise a spring steel formulation, for example, that enables the fastening ring to be malformed during installation, while springing back into its originally manufactured position once installed. As shown in FIGS. 6A, 6B and 26 through 27, the fastening ring 74 is capable of grabbing an inserted pipe's external surface 92 via two or more teeth 75 to ensure connections cannot be pulled apart. The fastening ring teeth 75 are angled downward from the substantially cylindrical perimeter or base 73 of the ring 74 and axially inwardly, such that when the pipe 90 is inserted, the teeth 75 exert a pressure against the pipe 90 to discourage the pipe 90 from slipping or moving back out of the fitting 12. The spacer wall 47 of the second axially intermediate portion 34 of the interior wall 13 of the fitting 12 is angled such as shown in FIG. 4 to permit flexing of the fastening ring teeth 75 to a limited degree as the release pusher 82 moves the teeth 75 axially inwardly during operation to facilitate insertion or removal of a piping element 90. The fastening ring base 73 has a radially outer surface 150, an axially inner surface 152 and an axially outer surface 154 for engaging other surfaces when installed as described herein. The fastening ring teeth 75 have an axially outer surface 175 which can be engaged by an axially inner surface of the seat ring 76 when installed as described herein. No wrenches, solder, welding, glue and/or twisting and turning the elements are required to form a connection. Specifically, the combination of the sealing ring(s) 70, fastening ring 74, seat ring 76, shield member 78 and seat retainer 80 provide a push-fit piping assembly when inserted into any cylindrical fitting (e.g., 12) in accordance with various embodiments of the present disclosure.

In various embodiments such as shown in FIGS. 5A, 5B and 24 through 27, one or more sealing members 70 is of sufficient size to firmly fit within the sealing ring compartment 22, against the sealing ring floor 45 and between sealing ring walls 41, 43 of the first axially intermediate portion 32 of the fitting 12. The base portion 73 of the fastening ring 74 is of sufficient diameter to firmly fit within the fastening ring compartment 24 with the axially inner surface 152 of the base 73 against fastening ring support wall 37 of the third axially intermediate portion 36 of the interior wall 13 of the fitting 12 when the device is assembled. In various embodiments such as shown in FIGS. 7 through 9 and 25, sealing ring spacer 72 includes a radially outer surface 171, a radially inner surface 174, an axially inner wall 172 and an axially outer wall 173, wherein the sealing ring spacer 72 is positioned within the sealing ring compartment 22. In various embodiments, the sealing ring spacer axially inner 173 and/or outer 174 walls are adapted to be in mating contact with the sealing ring 70, such as by being formed with a concave shape. The radially outer surface 171 of the sealing ring spacer 72 can engage the sealing ring floor 45 and the radially inner surface 174 can engage an inserted pipe external surface 92 during operation. The radially inner surface 174 can assist in guiding a pipe 90 over the sealing ring(s) 70 for proper alignment.

As shown in FIGS. 10 through 13 and 24 through 27, the seat ring 76 can include a base 160 formed with a radially inner tooth support 162. The seat ring base 160 has a radially outer surface 164 which can contact the fastening ring support floor 49 of the third axially intermediate portion 36 of the interior wall 13 of the fitting 12 during operation. The seat ring base 160 further has an axially inner wall 166 and an axially outer wall 167. The axially inner wall 166 engages the fastening ring base axially outer surface 154 when installed. The radially inner tooth support 162 extends axially and radially inwardly from the seat ring base 160 and is provided with an axially inner surface 168, an axially outer surface 169 and a radially inner surface 165. The radially inner surface 165 slidingly engages the outer surface of the release pusher 82 when installed. The axially inner surface 168 of the seat ring radially inner tooth support 162 engages at least a portion of the axially outer surface 175 of the fastening ring teeth 75 when installed and provides resistance to the natural pullback of the teeth 75 when a pipe 90 is being removed from the fitting 12. In various embodiments, the seat ring 76 is formed of metal or metal alloy, such as steel, for example. Also, in various embodiments, the axially inner surface 168 extends at an acute angle M of between approximately five and approximately sixty degrees.

Figure 14:
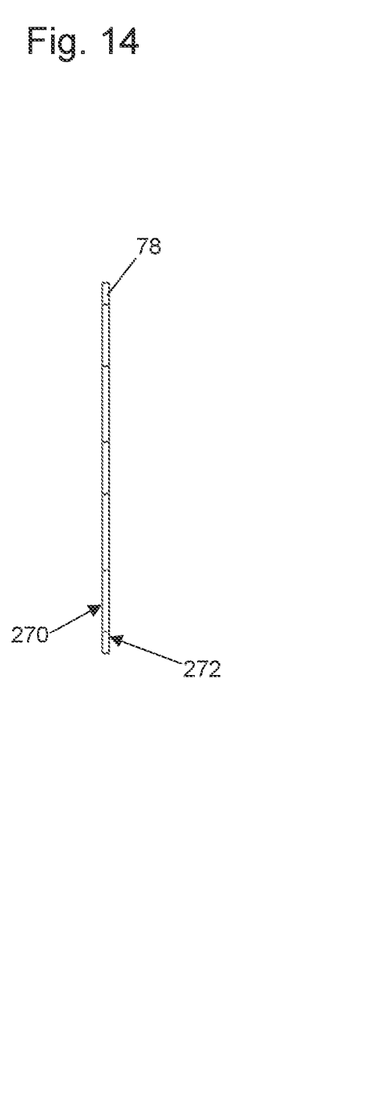
FIGS. 14 and 15 are right side and front views, respectively, of a shield member in accordance with embodiments of the present disclosure.
Figure 15:
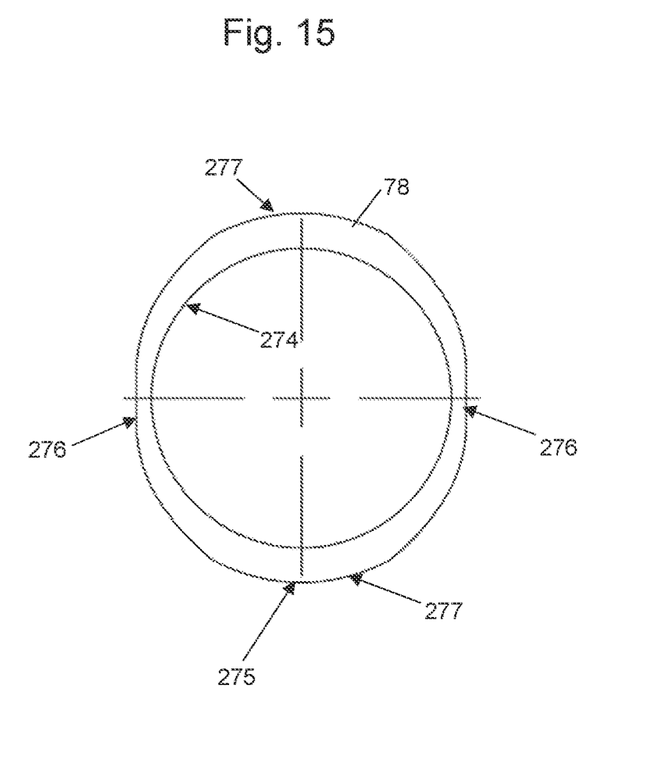

As shown in FIGS. 14 and 15, the shield member 78 is ring-shaped and provided with axially inner 270 and outer 272 faces, a radially inner surface 274 and a radially outer surface 275. In various embodiments, the radially inner surface 274 is substantially cylindrical and permits smooth sliding engagement with the release pusher 82, and the radially outer surface 275 is not cylindrical. In various embodiments, the radially outer surface 275 is formed with at least two parallel, diametrically opposed edge segments 276 and further is formed with at least two non-parallel, diametrically opposed edge segments 277. In this way, the shield member 78 can be easily maneuvered into place in the fourth axially intermediate portion 38 of the fitting interior wall 13 when being installed and removed. Once inserted, as shown in FIGS. 24 through 27, the radially outer surface 275 can engage the retainer support floor 52 and the axially inner face 270 can engage the retainer support wall 50. It will be appreciated that, due to the shaping of the shield member 78, the radially inner surface 274 is not in full contact with the release pusher 82. The shield member 78 can be formed of metal, for example.

Figures 16, 17, 18, 19:
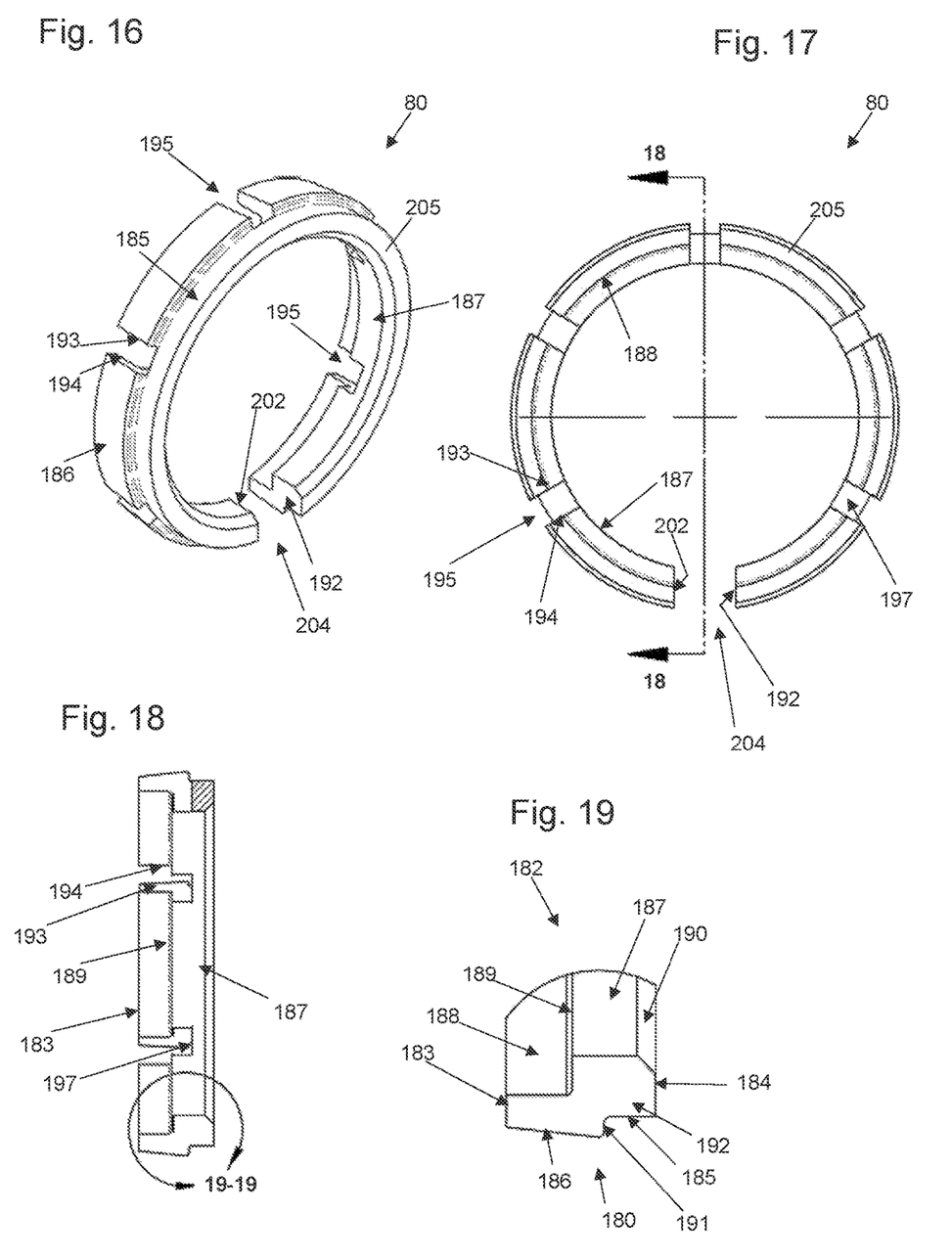
FIG. 16 is a front perspective view of a seat retainer in accordance with embodiments of the present disclosure.
FIG. 17 is a back view of the seat retainer of FIG. 16.
FIG. 18 is a cross-sectional view of the seat retainer taken along line 18-18 of FIG. 17.
FIG. 19 is an enlarged view of encircled portion 19-19 of FIG. 18.
Figure 20:
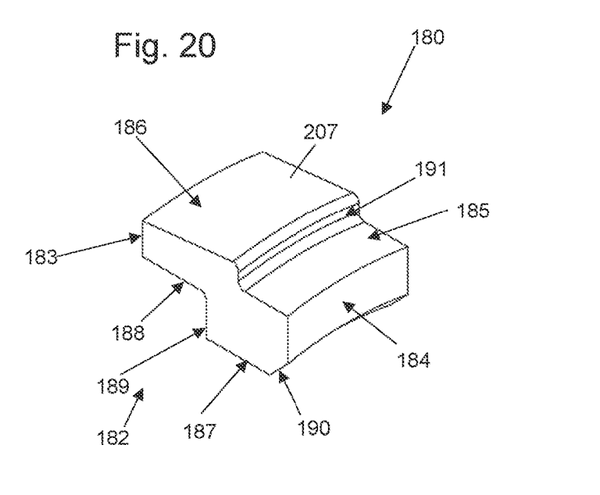
FIG. 20 is a front perspective view of a seat retainer body plug segment in accordance with embodiments of the present disclosure.

As shown in FIGS. 16 through 20 and 24 through 27, the seat retainer 80 is formed to permit desired flexion and support. A multi-level radially outer surface 180 and a multi-level radially inner surface 182 are shown in FIG. 19, along with an axially inner surface 183 and an axially outer surface 184. An axially outer segment 185 of the multi-level radially outer surface 180 extends axially inwardly from the axially outer surface 184 to a radially outwardly extending ledge 191, and an axially inner segment 186 of the multi-level radially outer surface 180 extends axially inwardly, and, in various embodiments also radially inwardly, from the ledge 191 to the axially inner surface 183. An axially inner segment 188 of the multi-level radially inner surface 182 extends axially outwardly from the axially inner surface 183 to a radially inwardly extending rampart 189, and an axially outer segment 187 of the multi-level radially inner surface 182 extends axially outwardly from the rampart 189 to an axially back wall 190. The axially back wall 190 can extend axially and radially outwardly form the axially outer segment 187 of the multi-level radially inner surface 182 to the axially outer surface 184 of the seat retainer 80. In various embodiments, the seat retainer 80 is formed with one or more openings or slots 195 formed by opposing side walls 193, 194 and back wall 197 that are formed and extend through portions of the radially outer surface 180 and radially inner surface 182 of the seat retainer 80. In various embodiments, the seat retainer can be stamped, formed or machined from plastic or metal alloys. In various other embodiments, the seat retainer is formed of a shape memory alloy (SMA) material. SMA is a hybrid blend of material such as nickel and titanium which can flex and return to a previous state or shape depending upon factors such as pressure, heat and cooling.

Figure 21:
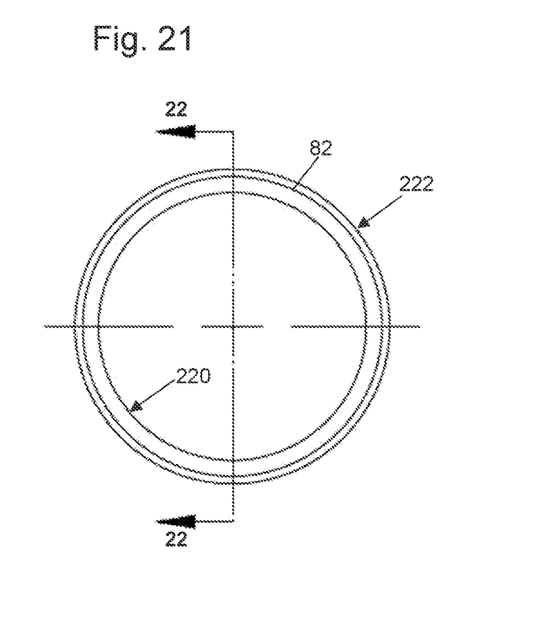
FIG. 21 is a front view of a release pusher in accordance with embodiments of the present disclosure.
Figure 22:
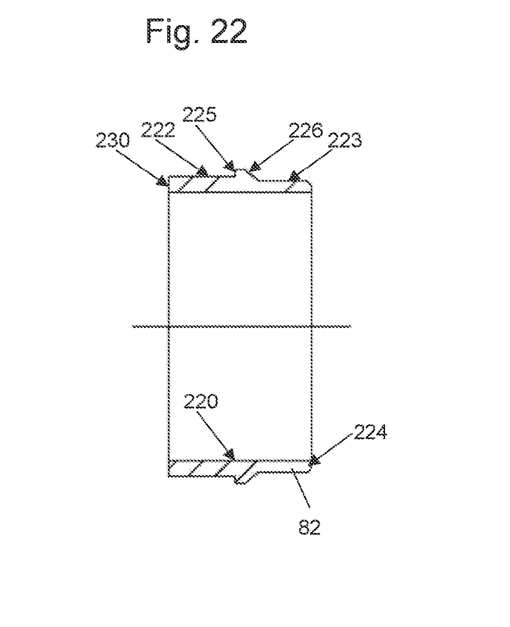
FIG. 22 is a cross-sectional view of the seat retainer taken along line 22-22 of FIG. 21.
Figure 23:
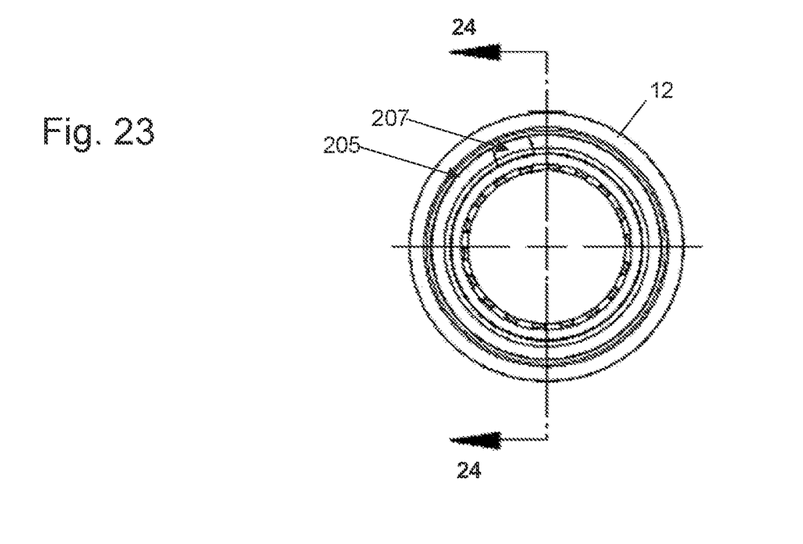
FIG. 23 is a side view of a fitting with joint assembly installed in accordance with embodiments of the present disclosure.
Figure 24:
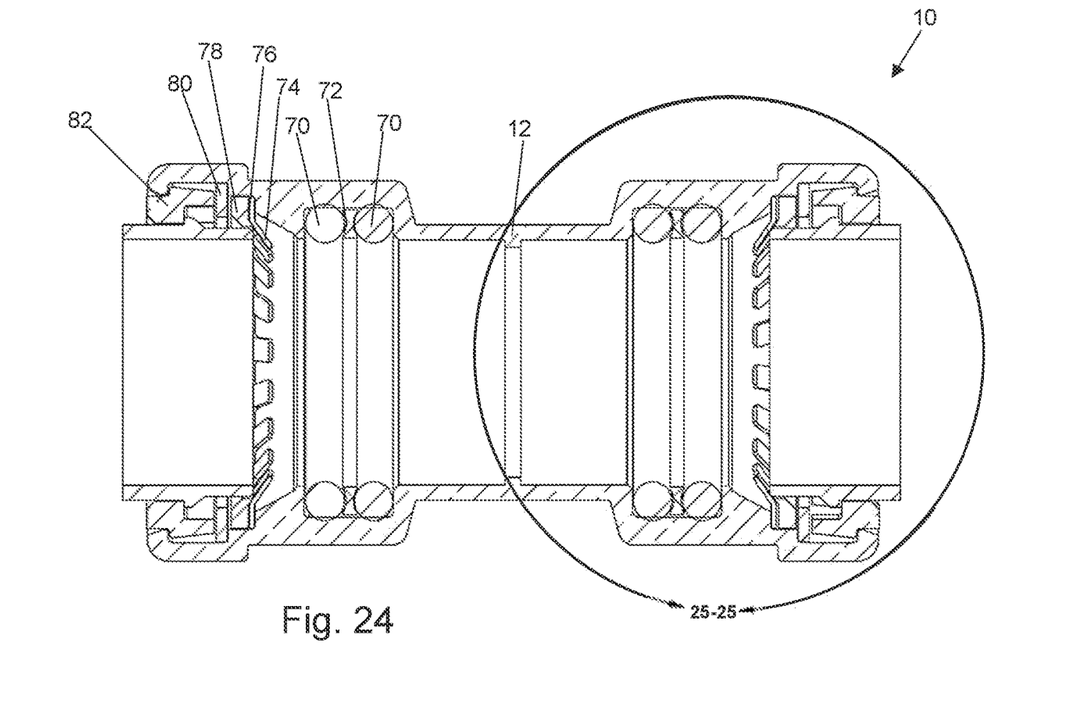
FIG. 24 is a front cross-sectional view of the fitting taken along line 24-24 of FIG. 23.

According to some embodiments of the present disclosure, the seat retainer 80 is split with opposing inner faces 192 and 202 forming a full slot 204 in the main body segment 205 of the seat retainer 80. In such embodiments, a body plug segment 207 can be provided as shown in FIG. 21, with surfaces 180, 182, 183, 184, 185, 186, 187, 188, 189, 190 and 191 corresponding to the same labeled surfaces of main body segment 205 in FIGS. 16 through 19. It will be appreciated that the body plug segment 207 can be positioned between the pair of opposing inner faces 192, 202 of the main body segment 205 to form a completed ring shape as shown in FIG. 23. With a removable body plug segment 207, the seat retainer 80 can be more readily manipulated into and out of the installed position. Further, each of the plurality of slots 195 permit flexibility and/or mild bending of the seat retainer 80 during operation. It will be appreciated that the plurality of slots 195 can be formed equidistantly around the circumference of the seat retainer 80. In various alternative embodiments, the seat retainer 80 is a continuous ring and no slot 204 or body plug segment 207 is employed. Further, according to some embodiments, no slots 195 are employed.

Figure 1:
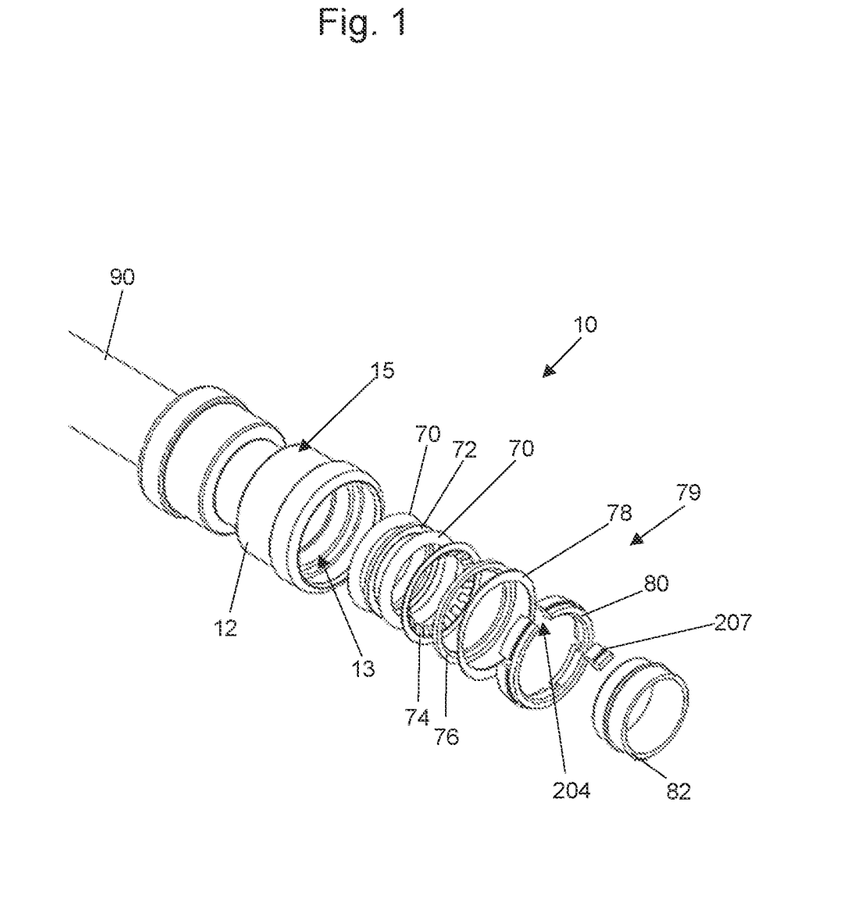
FIG. 1 is an exploded front perspective view of a piping joint assembly package in accordance with embodiments of the present disclosure.
Figure 25:
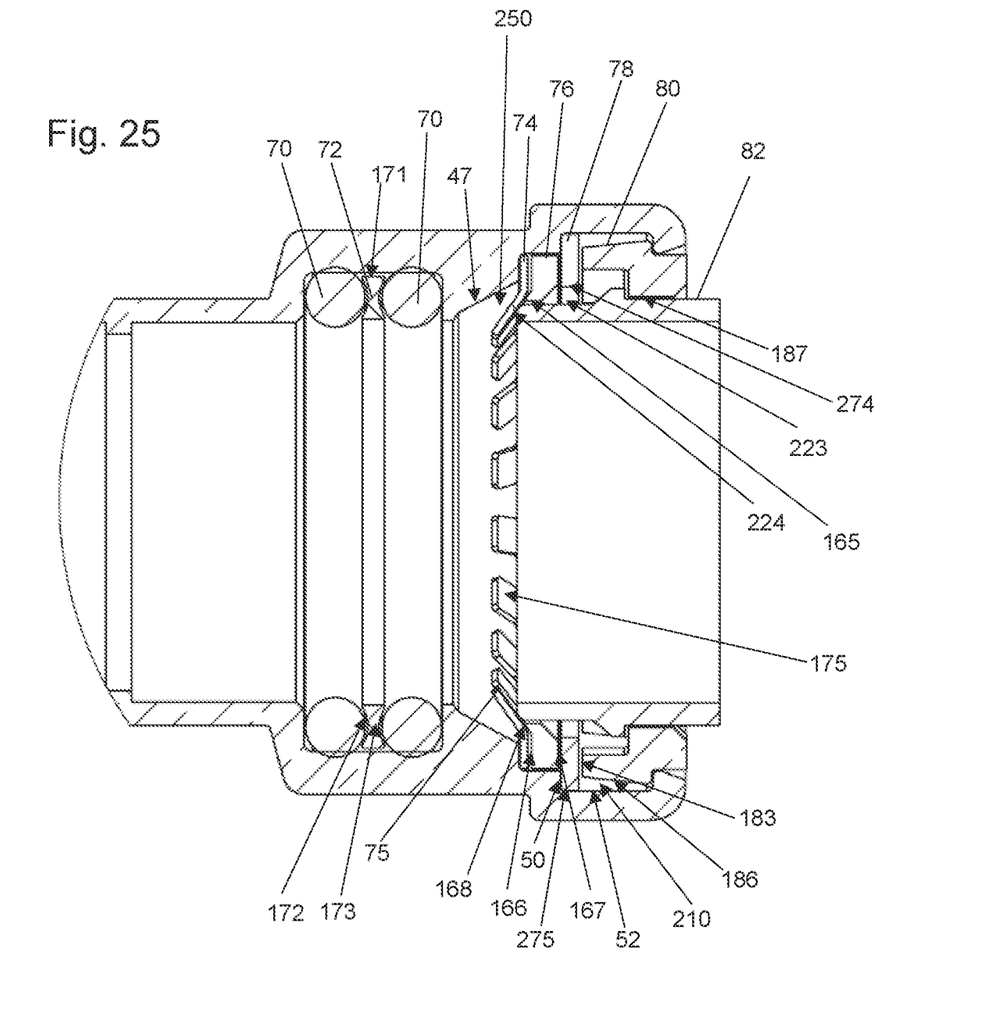
FIG. 25 is an enlarged view of encircled portion 25-25 of FIG. 24.

Regardless of whether the seat retainer 80 is split, the axially outer segment 187 of the multi-level radially inner surface 182 supports a sliding engagement with the release pusher 82 during operation. The axially outer segment 185 of the multi-level radially outer surface 180 engages the fifth divider edge 31 and extends into the axially outer portion 40 of the fitting interior wall 13. The axially inner segment 186 of the multi-level radially outer surface 180 can be angled as described elsewhere herein and thus does not fully engage the retainer support floor 52 of the fourth axially intermediate portion 38 of the fitting interior wall 13 when installed. Rather, a gap 210 as represented in FIG. 25 can exist between the axially inner segment 186 and the retainer support floor 52 to permit radial movement of the seat retainer 80 during operation. The axially inner surface 183 can engage the axially outer surface 172 of the shield member 78 for support when installed, Rampart 189 of the seat retainer 80 can act to support a wing of the release pusher 82 during operation. The seat retainer 80 and the shield member 78 can be considered an overall retainer 79 of the device as shown in FIG. 1, either independently or together according to various embodiments of the present disclosure. Further, the seat ring 76 and shield member 78 can be formed together as a single monolithic unit according to different embodiments of the disclosure. In still other embodiments, the seat ring 76, shield member 78 and seat retainer 80 can be formed together as a single monolithic unit. In such embodiments, the overall retainer 79 can thereby include the seat ring 76, shield member 78 and seat retainer 80.

As shown, for example, in FIGS. 21 through 22 and 24 through 27, the release pusher 82 is substantially cylindrical and includes an interior surface 220, an axially outer exterior surface 222, an axially inner exterior surface 223 and an external tip 224. The release pusher 82 further includes an annular retaining edge 225 extending radially outwardly of the axially outer exterior surface 222, wherein the annular retaining edge 225 includes an axially inner engaging wall 226 extending radially and axially outwardly from the axially inner exterior surface 223.

Shield member 78 can be designed and positioned such that it does not contact the axially inner exterior surface 223 of the release pusher 82 during operation, so as to minimize any resisting force on the operation of the release pusher 82. However, it will be appreciated that in various embodiments, the shield member radially inner surface 274 engages at least a portion of the inner exterior surface 223 of the release pusher 82 during operation to provide stabilization and support. In various embodiments, the release pusher 26 can comprise an injection-molded plastic material or a metal material such as brass, for example. When pressure is applied on the back edge 230 of the release pusher 82, the external tip 224 can engage the inside surface 175 of the fastening ring teeth 75, and the annular retaining edge 225 can removeably engage rampart 189 of the seat retainer 80, as shown in FIGS. 24 through 27.

In operation, and with reference to FIGS. 24 through 27, the fitting 12 of the present disclosure is provided and one or more sealing members 70 are inserted into the sealing ring compartment 22. The sealing ring spacer 72 can be inserted in the sealing ring compartment 22 such that one or both of the concave axially inner walls 172, 173 abut a curved surface of the sealing ring(s) 70. Next, the fastening ring 74, seat ring 76 and retainer 79 can be inserted, where the retainer 79 can include one or both of the shield member 78 and seat retainer 80. The fastening ring 74 and seat ring 76 are inserted into the fastening ring compartment 24 and the retainer 79 is inserted in the retainer compartment 26. Next, the release pusher 82 is inserted so as to slidingly engage at least the axially outer segment 187 of the multi-level radially inner surface 182 of the seat retainer 80, when employed, and the radially inner surface 165 of the seat ring 76. As described elsewhere herein, the release pusher 82 can also slidingly engage the edge segment 177 and/or 176 of the shield member 78.

Figure 26:
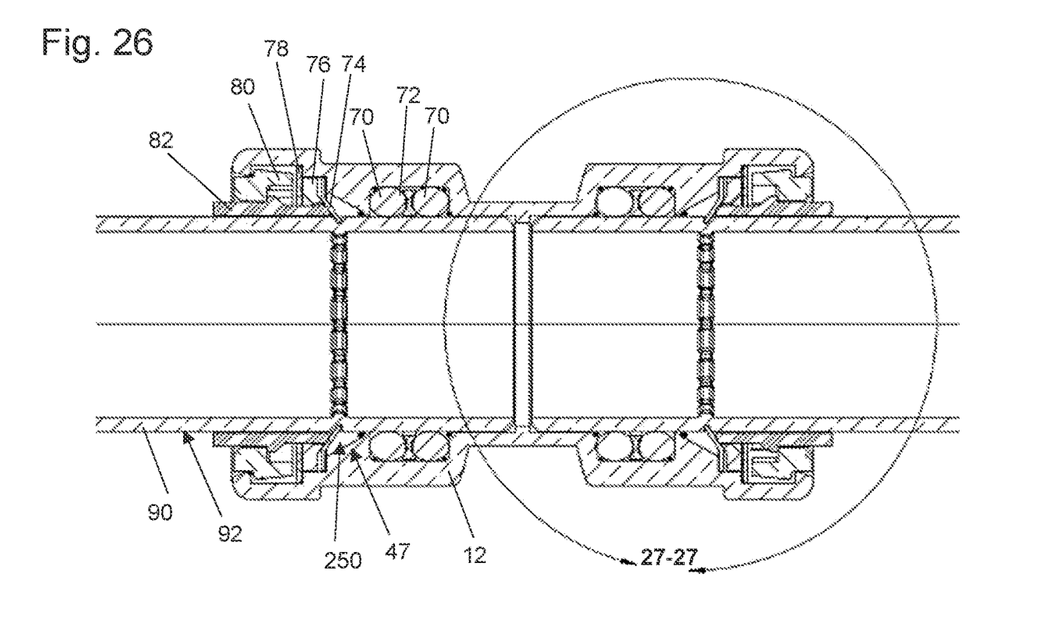
FIG. 26 is a front cross-sectional view a fitting with joint assembly and piping installed in accordance with embodiments of the present disclosure.
Figure 27:
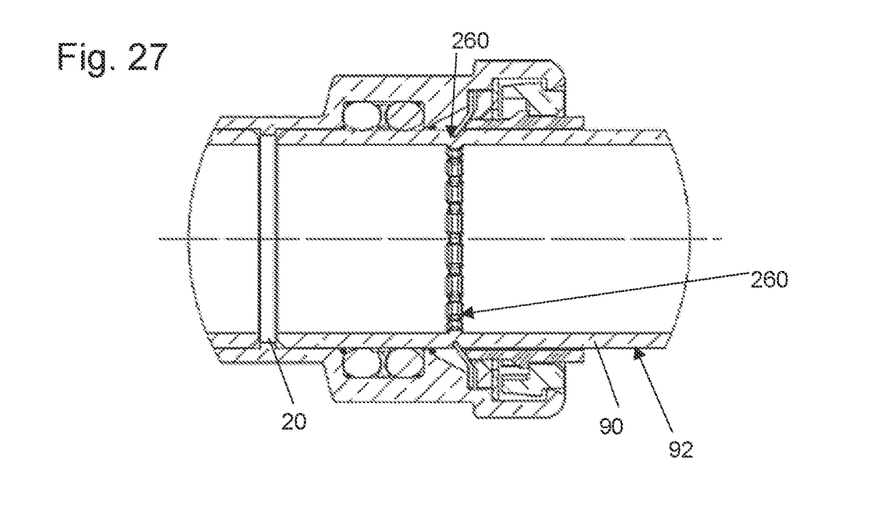
FIG. 27 is an enlarged view of encircled portion 27-27 of FIG. 26.

When the release pusher 82 is pushed axially inward toward the tube stop 20, the external tip 224 pushes the back face 175 of the fastening ring teeth 75 to create room for a pipe 90 to be inserted all the way to the tube stop 20, as shown in FIGS. 26 and 27. The teeth 75 can be moved into the gap 250 between the teeth 75 and the spacer wall 47 when pushed axially inwardly and can flex back against the axially inner surface 168 of the seat ring radially inner tooth support 162 when the release pusher 82 is released. In various embodiments, the teeth 75 are formed with a length L (FIG. 6B) that is sufficient to grab and modestly deform an inserted pipe 92 but without puncturing the pipe 92. The sealing members 70 provide a strong, leak-free seal and the fastening ring prohibits any inclination the pipe may have to slide out of position. As can be seen in FIGS. 26 and 27, an inserted pipe 92 can be formed of many materials, but in the instance of soft copper, an inserted pipe can be deformed as at 260 by the fastening ring teeth 75 digging in to resist retraction of the pipe 92. In various embodiments, the number of teeth 75 in the fastening ring 74 is particularly important, as too many teeth in a given area may prevent the pipe 92 from releasing properly, whereas too few teeth may not provide sufficient resistance to an inserted pipe 92.

The disclosure may be embodied in other specific forms without departing from the spirit or essential characteristics thereof. The present embodiments are therefore to be considered in all respects as illustrative and not restrictive, the scope of the disclosure being indicated by the claims of the application rather than by the foregoing description, and all changes which come within the meaning and range of equivalency of the claims are therefore intended to be embraced therein.

The invention claimed is:

1. A push-to-connect joint assembly, comprising:
    a fitting body comprising an interior wall and an exterior wall, wherein the interior wall defines a cavity extending axially through the fitting body, wherein the fitting body further comprises a first segment comprising an axially inner portion, an axially outer portion and first, second, third and fourth axially intermediate portions,
    wherein the first axially intermediate portion comprises a first sealing ring wall extending radially outwardly from the axially inner portion, a sealing ring engaging floor extending axially outwardly from the first sealing ring wall and a second sealing ring wall extending radially inwardly from the sealing ring engaging floor to a tube engaging platform,
    wherein the second axially intermediate portion comprises a spacer wall extending axially and radially outwardly from the tube engaging platform to an axially outer edge of the spacer wall,
    wherein the third axially intermediate portion comprises a fastening ring support wall extending radially outwardly from the axially outer spacer wall edge and a fastening ring support floor extending axially outwardly from the fastening ring support wall,
    wherein the fourth axially intermediate portion comprises a retainer support wall extending radially outwardly from the fastening ring support floor and a retainer support floor extending axially outwardly from the retainer support wall;
    at least one sealing ring positioned within the first axially intermediate portion;
    a fastening ring comprising a base portion and a plurality of teeth, wherein the base portion comprises an axially inner surface, an axially outer surface and a radially outer surface, wherein the base portion is positioned within the third axially intermediate portion, wherein the plurality of teeth of the fastening ring extend axially and radially inwardly of the base portion, wherein each of the plurality of teeth comprises an axially outer surface;

a retainer comprising a seat ring, wherein the seat ring comprises a seat ring base comprising an axially inner wall, an axially outer wall and a radially outer surface, wherein the seat ring is formed such that a radially inner tooth support extends axially and radially inwardly from the seat ring base and such that the axially inner wall of the seat ring engages the axially outer surface of the base portion of the fastening ring and the axially outer surface of each of the plurality of teeth, wherein the retainer further comprises a seat retainer, wherein the seat retainer comprises an axially inner surface, an axially outer surface, a radially inner surface and a radially outer surface, and wherein at least a portion of the radially outer surface is in mating contact with the retainer support floor of the fourth axially intermediate portion of the interior wall, wherein the axially inner wall of the seat retainer is formed with a plurality of spaced slots and wherein the seat retainer is positioned within the fourth axially intermediate portion.

2. The push-to-connect joint assembly of claim 1, wherein the seat retainer is formed as a main body segment and a detached body plug segment.

3. The push-to-connect joint assembly of claim 2, wherein the main body segment is formed with a slot between a pair of opposing inner faces of the main body segment.

4. The push-to-connect joint assembly of claim 3, wherein the body plug segment is positionable between the pair of opposing inner faces to form a ring shape.

* * * * *